(12) United States Patent
Heon et al.

(10) Patent No.: US 11,054,074 B2
(45) Date of Patent: Jul. 6, 2021

(54) SYSTEM AND METHOD FOR PUSH-TO-CONNECT COUPLINGS WITH INTEGRATED FILTRATION

(71) Applicant: ARNOTT, LLC, Merritt Island, FL (US)

(72) Inventors: Reno N. Heon, Grover Beach, CA (US); Dustin B. Heon, Arroyo Grande, CA (US)

(73) Assignee: ARNOTT, LLC, Merritt Island, FL (US)

( * ) Notice: Subject to any disclaimer, the term of this patent is extended or adjusted under 35 U.S.C. 154(b) by 683 days.

(21) Appl. No.: 15/710,665

(22) Filed: Sep. 20, 2017

(65) Prior Publication Data
US 2018/0080589 A1  Mar. 22, 2018

Related U.S. Application Data

(60) Provisional application No. 62/397,531, filed on Sep. 21, 2016.

(51) Int. Cl.
  *F16L 55/24* (2006.01)
  *F16L 37/092* (2006.01)
  (Continued)

(52) U.S. Cl.
  CPC ...... *F16L 37/0925* (2013.01); *B60H 1/00564* (2013.01); *B60H 3/0608* (2013.01);
  (Continued)

(58) Field of Classification Search
  CPC ............... F16L 37/0925; F16L 37/0926; F16L 37/0927; F16L 37/008; F16L 55/24; B60H 3/0608; B60H 1/00564
  See application file for complete search history.

(56) References Cited

U.S. PATENT DOCUMENTS 515,788 A * 3/1894 O'Meara ................. F16L 55/24
                                                                    210/318
979,481 A * 12/1910 Hannold ................. F16L 55/24
                                                                    210/445

(Continued)

FOREIGN PATENT DOCUMENTS

EP         1008796 A2 *  6/2000 ............ F16L 37/138

OTHER PUBLICATIONS

SPEC-D, Air Compressor Tank Pump, SKU AH-CMP0015, available at: http://www.specdtuning.com/ah-cmp0015.html, retrieved Aug. 29, 2016.

*Primary Examiner* — Matthew Troutman
*Assistant Examiner* — James A Linford
(74) *Attorney, Agent, or Firm* — Barnes and Thornburg LLP; Mark J. Nahnsen

(57) ABSTRACT

A push-to-connect coupling with integrated filtration is disclosed. In one aspect, the coupling comprises a tube support, a collet and a filter element. The coupling may include a seal. The coupling connects to a cavity, which may be a portable fitting. The cavity may be a connection on a separate device or system, such as an air tank or other devices. The filter element may be dome-shaped. The tube support is easily assembled with the cavity, for example by threading, to capture the filter element. The tube is connected to the coupling by pushing the tube over the tube support and through the collet. The collet interacts with a reduced diameter section of the cavity to apply a clamping force from the collet on the tube and secure the tube in place. The tube is easily removed from the cavity simply by pushing the collet farther into the cavity to remove the clamping force on the tube, and then pulling the tube out.

10 Claims, 6 Drawing Sheets

(51) Int. Cl.
*B60H 3/06* (2006.01)
*B60H 1/00* (2006.01)
*F16L 37/00* (2006.01)

(52) U.S. Cl.
CPC ......... *F16L 37/008* (2013.01); *F16L 37/0926* (2019.08); *F16L 37/0927* (2019.08); *F16L 55/24* (2013.01)

(56) References Cited

U.S. PATENT DOCUMENTS

| | | | |
|---|---|---|---|
| 2,071,478 A * | 2/1937 | Wick | F16L 33/213 |
| | | | 285/258 |
| 2,115,361 A | 4/1938 | Daggett | |
| 2,548,934 A | 4/1951 | Patrick | |
| 2,766,903 A | 10/1956 | Boni | |
| 3,256,069 A | 6/1966 | Peterson | |
| 3,279,645 A | 10/1966 | Harvey | |
| 3,392,848 A | 7/1968 | McConnell et al. | |
| 4,040,284 A | 8/1977 | Fuchs, Jr. | |
| 5,230,539 A | 7/1993 | Olson | |
| 5,505,501 A * | 4/1996 | Seabra | F16L 37/02 |
| | | | 285/23 |
| 5,683,120 A * | 11/1997 | Brock | F16L 37/0926 |
| | | | 285/148.21 |
| 5,775,742 A * | 7/1998 | Guest | F16L 37/0925 |
| | | | 285/322 |
| 5,810,309 A | 9/1998 | Augustine et al. | |
| 6,056,007 A | 5/2000 | Gochenouer et al. | |
| 6,086,044 A * | 7/2000 | Guest | F16L 37/0925 |
| | | | 251/148 |
| 6,155,524 A | 12/2000 | Legler et al. | |
| 6,224,117 B1 | 5/2001 | Olson et al. | |
| 6,675,831 B2 | 1/2004 | Sakaguchi et al. | |
| 6,834,674 B2 | 12/2004 | Koschany et al. | |
| 7,900,967 B2 * | 3/2011 | Jensen | F16L 55/115 |
| | | | 285/4 |
| 8,534,467 B2 | 9/2013 | Haas et al. | |
| 2003/0178846 A1 * | 9/2003 | Ezura | F16L 37/0925 |
| | | | 285/322 |
| 2005/0103959 A1 | 5/2005 | Lee | |
| 2007/0210273 A1 * | 9/2007 | Hsueh-Feng | F16L 37/0925 |
| | | | 251/149.6 |

\* cited by examiner

SYSTEM AND METHOD FOR PUSH-TO-CONNECT COUPLINGS WITH INTEGRATED FILTRATION

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. For example, this application claims the benefit of priority of U.S. provisional application No. 62/397,531, filed Sep. 21, 2016, and entitled "SYSTEMS AND METHODS FOR PUSH-TO-CONNECT COUPLINGS WITH INTEGRATED FILTRATION," the entire contents of which are incorporated herein by reference for all purposes and form a part of this specification.

BACKGROUND

Field

The present disclosure generally relates to couplings, for example, to a push-to-connect tube coupling having an integrated filtration component.

Description of the Related Art

Conduits such as tubes, hoses, pipes and others are commonly used to transport fluid in many different devices and systems. For example, flexible tubes are used to carry pressurized air in vehicle air suspension systems, air brake systems, air conditioning systems, and others. The tubes are connected to devices using couplings. However, existing couplings are time-consuming and expensive to manufacture. Specialized tools not readily available in the field are required to install existing couplings. Existing couplings also do not include filters that are easily serviceable and replaceable at low cost. There is, therefore, a need for improved solutions to tube couplings that overcome the aforementioned drawbacks.

SUMMARY

The embodiments disclosed herein each have several aspects no single one of which is solely responsible for the disclosure's desirable attributes. Without limiting the scope of this disclosure, its more prominent features will now be briefly discussed. After considering this discussion, and particularly after reading the section entitled "Detailed Description," one will understand how the features of the embodiments described herein provide advantages over existing systems, devices and methods.

Systems, devices and methods for push-to-connect couplings are described. The coupling may have filtration features. The push-to-connect coupling disclosed herein may be installed at any location within a fluid transport system for fluidly connecting a variety of different devices with a tube or other conduit. For example, the push-to-connect coupling may be used for fluidly connecting and providing filtration between a reservoir and an air suspension system, between a flexible tube or pipe and a valve, between two flexible tubes or pipes, between a flexible tube and a fitting body such as a conventional fitting, valve, manifold or similar device for transmitting and receiving fluid, or other applications. The fluid may be a variety of different fluids or fluid-like materials, such as liquids, air, gas mixtures, etc., which may also be pressurized. The tube may be any number of a variety of different conduit-type devices, such as flexible tubes, rigid tubes, hoses, pipes, other types, end fittings on these and other devices, etc.

The coupling may include a tube support and collet that are assembled into a cavity to easily connect and disconnect the tube to and from the cavity simply by pushing the collet. A filter may be included with the coupling. The collet and cavity may interact to apply a clamping force to the tube by the collet to secure the tube over the tube support inside the cavity. The tube may be easily removed from the cavity, simply by pushing in the collet and thereby removing the clamping force applied on the tube from the clamping portion of the collet. The clamping force may be removed by pushing the collet farther into the cavity to release flexible fingers of the collet from impinging on the tube. With the clamping force removed, the tube may then be easily pulled out and disconnected from the coupling.

The cavity may be part of the device to which the tube is being connected. Or the cavity may be separate from the device to which the tube is being connected, such as part of a fitting that the coupling is used with for a variety of different devices. In this latter example, the cavity can include a first end that couples with the tube and a second end that couples with the device. The second end of the cavity may be a universal type connection such that the coupling and the cavity can be secured to a variety of different devices. The coupling is configured to be received in the cavity simply by pushing the tube into the cavity and to lock in place the tube support and collet with the tube. The cavity is also configured to allow for sealing the tube to the cavity with a seal, such as an O-ring.

In some embodiments, the push-to-connect coupling includes a filter element integrated in a user-serviceable portion of the coupling such that the user can readily access, clean, or replace the filter element. The filter element may be a mesh, screen or other filter.

In one aspect, a push-to-connect coupling is described. The push-to-connect coupling comprises a tube support, a collet and a filter element. The tube support comprises an elongated cylindrical shaft having an inner passage defining an axis, the tube support including first and second ends, the first end including an outer contour configured to receive thereon a tube and the second end including an attachment portion. The collet comprises an annular base and a plurality of fingers, with each finger having a first end extending from the base to a second free end, the first end including a flexible portion attached to the base, and the second end including a projection extending radially outward. The fingers each have an inner clamping portion configured to surround the tube, and the collet defines an opening and an inner passage extending therethrough. The filter element comprises a series of openings configured to filter fluid flowing therethrough. The attachment portion of the tube support is configured to attach to a cavity and secure the filter element between the second end of the tube support and the cavity, and the collet is configured to be inserted into the cavity and to secure the tube in the cavity by the fingers compressing the tube onto the tube support.

In some embodiments, the filter is a mesh filter. In some embodiments, the filter element is dome-shaped. In some embodiments, the fingers of the collet are configured to flex radially inward to compress the tube onto the tube support. In some embodiments, the fingers of the collet are configured to flex radially inward by pulling the collet axially outward of the collet so that fingers contact a reduced diameter section of the cavity. In some embodiments, the first end of the tube support comprises a slot configured to receive a tool to rotate the tube support. In some embodiments, the push-to-connect coupling further comprises a seal configured to extend circumferentially between the tube and the cavity. In some embodiments, the seal is an O-ring. In some embodiments, a device separate from the coupling comprises the cavity. In some embodiments, the device is an air tank, a reservoir, a solenoid valve manifold, a valve manifold block, an air compressor, or an air spring end cap. In some embodiments, the coupling comprises the cavity. In some embodiments, the cavity is a fitting configured to attach to a device separate from the coupling. In some embodiments, the attachment portion comprises external threads configured to engage internal threads of the cavity.

In another aspect, a push-to-connect coupling system is described. The push-to-connect coupling system comprises a coupling and a cavity. The coupling comprises a tube support, a collet, and a filter element. The tube support comprises a shaft having an inner passage defining an axis, the tube support including first and second ends. The collet comprises an annular base and a plurality of fingers, with each finger having a first end extending from the base to a second free end having a projection extending radially outward, and the collet defining an opening and an inner passage extending therethrough. The second end of the tube support is configured to attach to the cavity and the collet is configured to be inserted into the cavity and to secure a tube in the cavity by the fingers compressing the tube onto the tube support. The cavity comprises a bore, an attachment portion, an increased diameter section, a reduced diameter section and an opening. The attachment portion is adjacent the bore and configured to engage the second end of the tube support. The increased diameter section is adjacent the bore. The reduced diameter section is adjacent the increased diameter section. The opening is adjacent the reduced diameter section and configured to receive therethrough the filter element, the collet, the tube support and the tube.

In some embodiments, an attachment portion at the second end of the tube support is engaged with the attachment portion of the cavity and the filter element is secured in the bore by the tube support. In some embodiments, the projections of the fingers are in contact with the reduced diameter section of the cavity to provide a clamping force on the tube with a clamping portion of the fingers. In some embodiments, the filter element is a mesh filter.

In another aspect, a method of using a push-to-connect coupling with a tube and a cavity is described. The coupling comprises a collet and a tube support. The method comprises advancing the collet in a first direction into the cavity such that fingers of the collet flex radially inward as the fingers traverse a reduced diameter section of the cavity and flex radially outward as the fingers enter an increased diameter section of the cavity; securing the tube support in the cavity; extending the tube over the tube support; and retracting the collet in a second direction that is opposite the first direction to contact the fingers with the reduced diameter section of the cavity to cause the fingers to flex radially inward and provide a clamping force on the tube.

In some embodiments, the method further comprises inserting a filter into the cavity and securing the filter by compressing it between the cavity and the tube support. In some embodiments, the method further comprises advancing the collet in the first direction to locate the fingers in an increased diameter section of the cavity to cause the fingers to flex radially outward and reduce the clamping force on the tube, and pulling the tube out of the cavity In another aspect, a method of connecting a tube to a cavity using a push-to-connect coupling is described. A tube support is rotatably coupled with the cavity. A collet is inserted into the cavity. Fingers of the collet flex inward through the reduced diameter section of the cavity and then flex outward inside the increased diameter section of the cavity. The tube slides through the collet and over the tube support. An inner clamping portion of the collet clamps over the tube to secure it in place. The reduced diameter section of the cavity prevents the collet from being removed when the tube is inserted in the cavity. The reduced diameter section of the cavity applies inward radial force to the flexible fingers of the collet when a removal force is applied to the tube, serving to retain the tube and prevent its removal until the clamping force from the collet is intentionally retracted, at which point the tube may be removed. The clamping force from the collet may be retracted by pushing the collet farther into the cavity to remove the inward radial force applied to the flexible fingers of the collet by the reduced diameter section of the cavity.

The foregoing summary is illustrative only and is not intended to be in any way limiting. In addition to the illustrative embodiments and features described herein, further aspects, embodiments, objects and features of the disclosure will become fully apparent from the drawings and the detailed description.

BRIEF DESCRIPTION OF THE DRAWINGS

The foregoing and other features of the present disclosure will become more fully apparent from the following description, taken in conjunction with the accompanying drawings. Understanding that these drawings depict only several embodiments in accordance with the disclosure and are not to be considered limiting of its scope, the disclosure will be described with additional specificity and detail through use of the accompanying drawings. In the following detailed description, reference is made to the accompanying drawings, which form a part hereof. In the drawings, similar symbols typically identify similar components, unless context dictates otherwise. The illustrative embodiments described in the detailed description and drawings are not meant to be limiting. Other embodiments may be utilized, and other changes may be made, without departing from the spirit or scope of the subject matter presented here. It will be readily understood that the aspects of the present disclosure, as generally described herein, and illustrated in the drawing, can be arranged, substituted, combined, and designed in a wide variety of different configurations, all of which are explicitly contemplated and make part of this disclosure.

DETAILED DESCRIPTION

The following detailed description is directed to certain specific embodiments of the technology. In this description, reference is made to the drawings wherein like parts or steps may be designated with like numerals throughout for clarity. Reference in this specification to "one embodiment," "an embodiment," or "in some embodiments" means that a particular feature, structure, or characteristic described in connection with the embodiment is included in at least one embodiment of the invention. The appearances of the phrases "one embodiment," "an embodiment," or "in some embodiments" in various places in the specification are not necessarily all referring to the same embodiment, nor are separate or alternative embodiments necessarily mutually exclusive of other embodiments. Moreover, various features are described which may be exhibited by some embodiments and not by others. Similarly, various requirements are described which may be requirements for some embodiments but may not be requirements for other embodiments.

Embodiments of the technology will now be described with reference to the accompanying figures, wherein like numerals refer to like elements throughout unless otherwise indicated explicitly or by context. The terminology used in the description presented herein is not intended to be interpreted in any limited or restrictive manner, simply because it is being utilized in conjunction with a detailed description of certain specific embodiments of the technology. Furthermore, embodiments of the technology may include several novel features, no single one of which is solely responsible for its desirable attributes or which is essential to practicing the invention described herein.

Systems, devices and methods for a push-to-connect coupling 1 are described. In some embodiments, features for the push-to-connect coupling 1 with a cavity 2 are described. In some embodiments, features for the push-to-connect coupling 1 with integrated filtration features are described.

Figure 1:
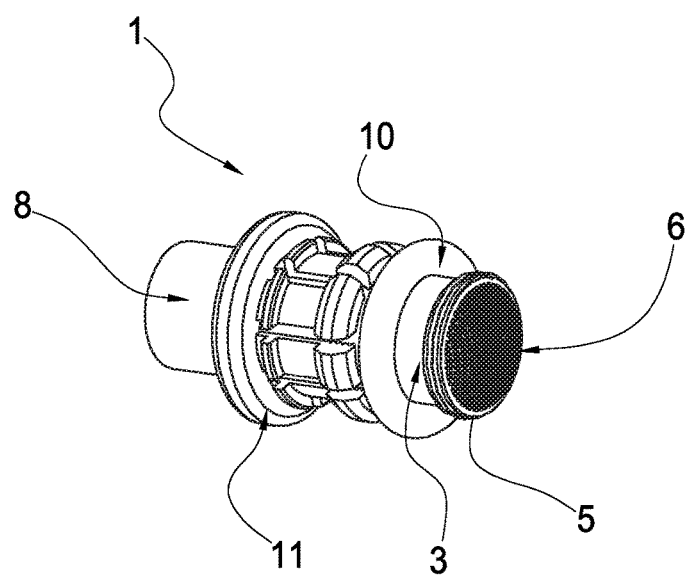
FIG. 1 is a perspective view of one embodiment of the push-to-connect coupling shown connected to a portion of a tube.
Figure 2:
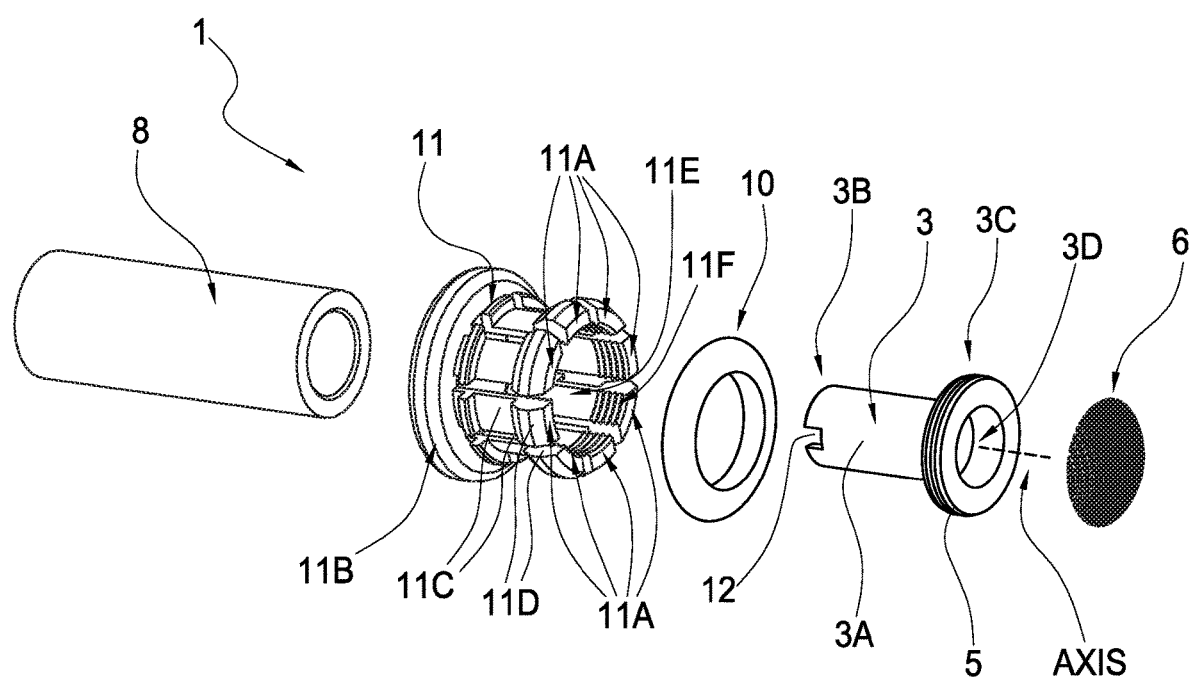
FIG. 2 is an exploded view of the push-to-connect coupling of FIG. 1.
Figure 3A:
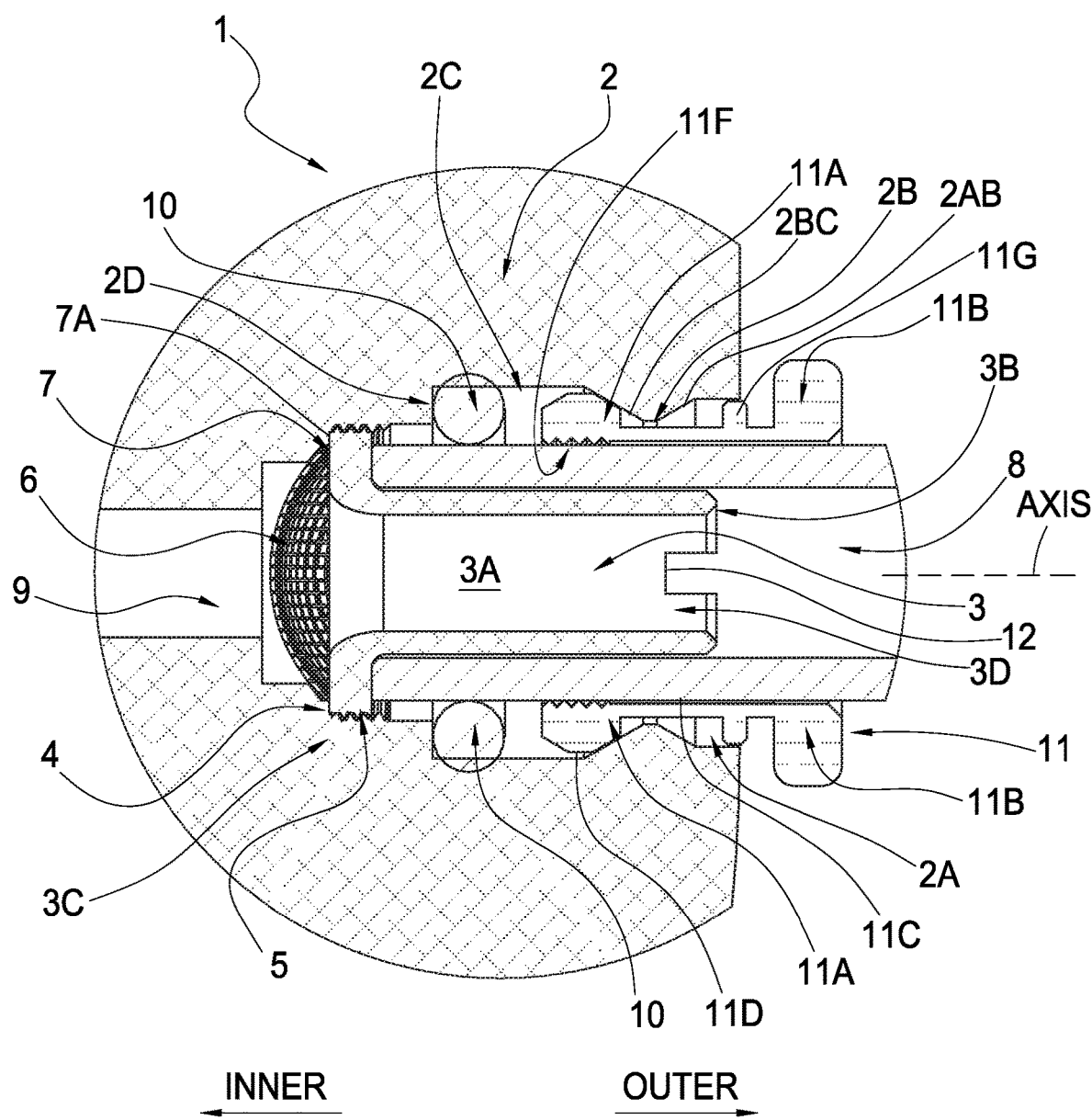
FIG. 3A illustrates a cross-sectional view of the push-to-connect coupling of FIG. 1 connected to an embodiment of a cavity.

FIGS. 1-3A illustrate an embodiment of the push-to-connect coupling 1. FIG. 1 illustrates a perspective view of the push-to-connect coupling 1, shown connected to a portion of a tube 8. FIG. 2 is an exploded view of the push-to-connect coupling 1. FIG. 3A illustrates a cross-sectional view of the push-to-connect coupling 1 shown connected to an embodiment of a cavity 2.

The coupling 1 may be used for many different functions and purposes. For example, the coupling 1 may be used to connect flexible tubes 8 in fluid transport systems, including fluid power systems such as, for example, pressured air systems for vehicle air suspension systems. The coupling 1 may involve fluid connections between pneumatic system components such as valve manifolds, air tanks, air springs, air compressors and the like. The tubes 8 may use the coupling 1 to connect an end of the tube 8 to a component of the fluid transport system, such as a fitting, valve, manifold or similar device for transmitting and receiving pressurized fluid or air. In some embodiments, the coupling 1 permits the tube 8 to be quickly and easily connected to a valve or manifold body. "Fluid" as used herein may include gases, liquids, semi-liquids, wet solids, other flowable or otherwise moveable materials, or combinations thereof.

The coupling 1 and associated methods of use with the coupling 1 provide many advantages to performing these and other possible functions. For example, the coupling 1 is useful for easily and simply allowing assembly and disassembly of tubing or other similar type connections. For example, the coupling 1 may be used to fluidly connect the various components without tools. The coupling 1 may provide for a making a connection and/or disconnection as rapidly as possible. A variety of devices, components, etc. may be used with the coupling 1. In some embodiments, the coupling 1 allows for quickly and fluidly connecting and sealing a tube or pipe to the coupling 1 and the cavity 2. For example, in some embodiments, the sealed connection is made simply by inserting the tube or pipe into the coupling 1 and cavity 2. For example, the tube 8 may be connected by simply inserting a free end of the tube 8 into the coupling 1. In some embodiments, the tube 8 is easily removed from the cavity 2 simply by pushing in a collet 11 and thereby removing or reducing a clamping force on the tube 8 applied by the collet 11 (as described herein) and then pulling the tube 8 out of the cavity 2, all of which may be done by hand.

Another advantage of the coupling 1 is the ability to incorporate filtration features simply, easily and economically. Fluid transport systems, including fluid power systems such as, for example, pressured air systems for vehicle air suspension systems, all face the potential of being contaminated with undesirable foreign debris such as particles. This debris may originate from within the components originally, or may be introduced during the installation and assembly of the system, or may enter the system throughout its life by way of the compressed air inlet passage. This contamination or debris may include dirt, small pieces of rubber from the air spring manufacturing process, thread sealant tape from the installation process, metal shavings or grit that may have accidentally entered an open tube or cavity during installation, or chunks of corrosion developed over the life of the system due to surface deterioration of numerous potential system components. The presence of this contamination or debris can be extremely undesirable for precision sealing devices within the system such as fluid or pneumatic valves. In these cases, the sealing surface of the valve can become clogged with debris preventing it to fully close and properly seal. This improper valve seal can result in improper valve functions such as air leaking out of the system to the atmosphere or air leaking into or out of the device being actuated which is not desirable.

In some embodiments, the coupling 1 includes one or more filtration component(s), such as one or more filter elements 6 (as further described herein). The push-to-connect coupling 1 may include the filtration component without needing additional separate devices. This may, for example, reduce or minimize potential leak points within, between, etc. the various fluid transport systems. In some embodiments, the push-to-connect coupling 1 also enables convenient field servicing of the filter element, for example if it becomes overly contaminated.

As shown in FIGS. 1-3, the coupling 1 generally will include a tube support 3. The tube support 3 may be formed from polymer, plastic, composite, metals, other suitable materials, or combinations thereof. The tube support 3 may be a single piece or may be multiple pieces connected together.

The tube support 3 may include an elongated shaft 3A. The shaft 3A may be a single piece or may be multiple pieces connected together. The shaft 3A may include a sidewall extending circumferentially about a perimeter of the shaft 3A. The shaft 3A may be cylindrical. In some embodiments, the shaft 3A may be other shapes, such as rounded, elliptical, segmented, polygonal, partially rounded, partially straight-segmented, other shapes, or combinations thereof. The shaft 3A defines an opening 3D extending through the shaft 3A.

The shaft 3A may have single, continuous opening 3D extending therethrough, as shown. In some embodiments, one or more openings 3D, e.g. passages, channels, etc., may extend through the shaft 3A. As shown, a single opening 3D extends through the shaft 3A and defines a longitudinal axis therethrough (shown in FIG. 2).

The tube support 3A includes a first end 3B and a second end 3C. The tube support 3A may include the first end 3B having a first opening and a second end 3C opposite the first end 3B and having a second opening. The first and second openings at the first and second ends 3B, 3C may be at first and second ends, respectively, of the longitudinal opening 3D that extends through the shaft. The first end 3B may be a first end of the shaft 3A, as shown. The first end 3B may have an outer contour that is configured for suitably receiving an end portion of the tube 8. The first end 3B may be circular as shown, or other shapes, for example as described herein with respect to the shape of the shaft 3A. The second end 3C may include attachment features, as further described. In some embodiments, the second end 3C may be a second end of the shaft 3A. The shaft 3A may have an axial length, as measured from the first end 3B to the second end 3C (or to the attachment portion 5) from about one quarter inches to about two inches, or any lesser or greater amount. The shaft 3A may have an outer width, e.g. outer diameter, from about one-eighth inch to about six inches, or any lesser or greater amount. The opening 3D may have an inner width, e.g. inner diameter, from about one-sixteenth inch to about five inches, or any less or greater amount.

The tube support 3 may include an attachment portion 5. As shown the second end 3C includes the attachment portion 5 having threads, which may be external threads. The second end 3C may have an attachment portion 5 with external threads for attaching to the cavity 2, as further described. The attachment portion 5 may include a flange, as shown. The flange may extend outward away from the axis. The flange may extend outward from the second end 3C of the shaft 3A. The threads may be located along a radially outer surface of the flange of the attachment portion 5. The attachment portion 5 may have a width that is larger than the width of the shaft 3A. The outer width, e.g. external diameter, of the attachment portion 5 may be greater than an outer width, e.g. external diameter, of the shaft 3A. The second end 3C may include the attachment portion 5 for connecting to the cavity 2, as further described herein. In some embodiments, the attachment portion 5 may have other attachment features, alternatively or in addition to threads, for attaching to the cavity 2. The attachment portion 5 may include threads, snap fit features, fastening features, friction fit features, other attachment features, or combinations thereof. The attachment portion 5 may have an outer diameter from about one-quarter inch to about seven inches, or any lesser or greater amount.

The tube support 3 supports the tube 8. The tube 8 may be any number of a variety of different conduits suitable for allowing fluid to flow through it, such as flexible tubes, rigid tubes, semi-rigid tube, hoses, pipes, lines, guides, catheters, short segments of fluid passage components such as fittings, or other suitable tubes or conduits. The first end 3B may of the tube support 3 may include an outer contour configured to receive the tube 8 thereon, thereover, etc. The tube support 3 may extend axially within an end portion of the tube 8. The tube 8 may slide over the tube support 3. In some embodiments, the tube 8 may fit snugly over the tube support 3. In some embodiments, there may be an annular gap between the outer surface of the tube support 3 and the inner surface of the tube 8. In some embodiments, the tube support 3 may attach to, in, on or otherwise with the tube 8 in a variety of ways. For example, the tube 8 may attach inside the tube support 3, attach to features of the tube support 3 such as a fitting, attach to an end of the tube support 3, other approaches, or combinations thereof. In one embodiment, the tube 8 has an inner width, e.g. an inner diameter, in the range of about one-eighth inch to about six inches, or any lesser or greater amount. Exemplary lengths of the tube 8 range from about one inch to about five thousand feet.

In some embodiments, the tube support 3 may include a slot 12. The first end 3B of the tube support 3 may include the slot 12, as shown. The slot 12 may be a notch extending axially along a portion of the sidewall of the shaft 3A at the first end 3B to define an opening. In some embodiments, the slot 12 may be an external facing surface of the first end 3B. The slot 12 may extend axially from the first end 3B toward the second end 3C for a length from about one quarter inch to about one inch, or any lesser or greater amount. The slot 12 may have a width, e.g. a circumferential width, from about one-sixteenth inch to about two inches, or any lesser or greater amount. The slot 12 may be sized to allow a screwdriver head therein. There may be more than one slot 12, located at various angular orientations of the sidewall. For example, there may be two slots 12 located one hundred eighty degrees apart at the first end 3B. The slot 12 may be used for installation and removal of the tube support 3 from the cavity 2, as further described.

In some embodiments, other features alternative to or in addition to the slot 12 may be used for installing and/or removing the tube support 3 from the cavity 2. For example, the slot 12 may instead or in addition include one or more protrusions, keys, ridges, buttons, other features, or combinations thereof. In some embodiments, the coupling 1 includes a collapsible version of the tube support 3. For example, the tube support 3 may include collapsible fingers extending longitudinally away from the first end 3B. A corresponding annular groove may be located in the cavity 2 for receiving the collapsible fingers of the tube support 3. Thus, the tube support 3 may attach with the cavity 2 with a variety of approaches.

One or more components of the coupling 1 may be made from a variety of suitable plastic materials, such as thermoplastics and thermosetting polymers. In some preferred embodiments, one or more components of the coupling 1 may be made from various thermoplastics, polymers, polyethylene (PE), polypropylene, polystyrene and polyvinyl chloride (PVC), HDPE Polyethylene, Polyphenylene Sulfide, Polysulfone, Nylon-6,6, other suitable Liquid crystal polymers, other suitable materials, or combinations thereof. In some embodiments, the tube support 3 is manufactured using brass and/or aluminum, or alloys thereof. In some embodiments, the collet 11 and the tube support 3 are manufactured using brass and/or aluminum, or alloys thereof. Other materials may be used for the coupling 1 and components thereof, although they are preferably chosen to provide strength and impact resistance through a wide range of environmental conditions.

As shown in FIG. 3A, the coupling 1 may connect with the cavity 2. The cavity 2 may include an opening 2A. The opening 2A may be a circular opening 2A having an inner width, e.g. inner diameter. The opening 2A may have an inner width from about one-eighth inch to about six inches, or any lesser or greater amount. In some embodiments, the opening 2A may be rounded, polygonal, segmented, other shapes, or combinations thereof. The opening 2A may extend axially into the cavity for a length. "Axial" here refers to a direction at least generally along an axis defined by the axis of the coupling 1 when the coupling 1 is installed in the cavity 2. The opening 2A may therefore be a bore. The inner width of the opening 2A may be measured perpendicularly to the axis. The length of the opening 2A may refer to the length of the opening 2A having a uniform inner width dimension. In some embodiments, the length may include a transition portion 2AB, as described herein. The opening 2A may have an axial length from about one quarter inch to about two inches, or any lesser or greater amount. The opening 2A may have a width, e.g. a diameter, from about one-eighth inch to about six inches.

The cavity 2 may include a reduced diameter section 2B that has a smaller inner width, e.g. inner diameter, than the inner width of the opening 2A. The opening 2A may extend axially inward (to the left as oriented in FIG. 3A) to the reduced diameter section 2B. The opening 2A may be adjacent the reduced diameter section 2B. The reduced diameter section 2B may be a circular-shaped section. In some embodiments, the reduced diameter section 2B may be non-circular, rounded, polygonal, segmented, other shapes, or combinations thereof. The reduced diameter section 2B may have an inner width, e.g. diameter, from about one-sixteenth inch to about six inches, or any lesser or greater amount.

There may be a transition portion 2AB of the cavity 2 from the opening 2A to the reduced diameter section 2B, as shown. In some embodiments, the transition portion 2AB from the opening 2A to the reduced diameter section 2B may be smooth, e.g. ramped, as shown. In some embodiments, the transition portion 2AB may be smooth, ramped, stepped, straight, rounded, other contours, or combinations thereof. The transition portion 2AB may be considered to be part of the opening 2A and/or part of the reduced diameter section 2B.

The reduced diameter section 2B may extend axially into the cavity for a length. The length of the reduced diameter section 2B may refer to the length of the reduced diameter section 2B having a uniform inner width dimension. In some embodiments, the length may include the transition portion 2AB. The reduced diameter section 2B may have a length from about one eighth inch to about one inch, or any lesser or greater amount.

The cavity 2 may include an increased diameter section 2C that has a larger inner width, e.g. inner diameter, than the reduced diameter section 2B. The reduced diameter section 2B may extend axially inward (to the left as oriented in FIG. 3A) for a length into the cavity to the increased diameter section 2C. The increased diameter section 2C may be adjacent to the reduced diameter section 2B. The increased diameter section 2C may have an inner width, e.g. diameter, from about one-eighth inch to about seven inches, or any lesser or greater amount. The increased diameter section 2C may be a circular-shaped section. In some embodiments, the increased diameter section 2C may be non-circular, rounded, polygonal, segmented, other shapes, or combinations thereof.

There may be a transition portion 2BC of the cavity 2 extending from the reduced diameter section 2B to the increased diameter section 2C, as shown. In some embodiments, the transition portion 2BC from the reduced diameter section 2B to the increased diameter section 2C may be smooth, e.g. ramped, as shown. In some embodiments, the transition portion 2BC may be smooth, ramped, stepped, straight, rounded, other contours, or combinations thereof. The transition portion 2BC may be considered to be part of the reduced diameter section 2B and/or part of the increased diameter section 2C. The inner width of the increased diameter section 2C may be greater than the inner width of the opening 2A. In some embodiments, the inner width of the increased diameter section 2C may be greater than, equal to, or less than the inner width of the opening 2A.

The increased diameter section 2C may extend axially into the cavity for a length. The length of the increased diameter section 2C may refer to the length of the increased diameter section 2C having a uniform inner width dimension. In some embodiments, the length may include the transition portion 2BC. The length of the increased diameter section 2C may be from about one-quarter inch to about six inches, or any lesser or greater amount. The length of the increased diameter section 2C may be greater than the length of the opening 2A, which may be greater than the length of the reduced diameter section 2B. In some embodiments, other relationships regarding these relative lengths may be incorporated.

The illustrated cavity 2 includes a bore 7. The increased diameter section 2C may extend axially inward to the bore 7. The bore 7 may be a circular opening or openings extending axially inward from the increased diameter section 2C. The bore 7 may have an opening with an inner width, e.g. inner diameter, that is less than the inner width of the increased diameter section 2C. In one embodiment, the bore 7 has an inner width, e.g. diameter, in the range of about one-sixteenth inch to about five inches, or any lesser or greater amount.

There may be a transition portion 2D that provides a transition from the inward end of the increased diameter section 2C to the outward end of the bore 7. The transition portion 2D may be part of the increased diameter section 2C and/or part of the bore 7. The transition portion 2D may extend radially inward as shown. In some embodiments, the transition portion 2D may be radially inward, smooth, ramped, stepped, straight, rounded, other contours, or combinations thereof. The bore 7 may be circular. In some embodiments, the bore 7 may be non-circular, rounded, polygonal, segmented, other shapes, or combinations thereof.

The bore 7 may extend axially inward for a length. The length of the bore 7 may extend from an outer end near the increased diameter section 2C to an inward end of the bore 7. The length of the bore 7 may be from about one-sixteenth inch to about two inches, or any lesser or greater amount. The bore 7 may be adjacent to the increased diameter section 2C. By "adjacent to" it is not implied that other structures or features are not between two adjacent features. For example, other components, such as a seal 10, etc. may be between the various adjacent features, such as the seal 10 in between a portion of the increased diameter section 2C and the adjacent bore 7.

The bore 7 may include an attachment portion 4. The attachment portion may be located at the inward end of the bore 7. The attachment portion 4 may provide features for attaching to the tube support 3. The attachment portion 4 may include internal threads, as shown. The attachment portion 4 of the cavity 2 may fasten to the attachment portion 5 of the tube support 3. In some embodiments, the attachment portion 4 may include threads, snap fit features, fastening features, friction fit features, other attachment features, or combinations thereof.

The inward end of the bore 7 may include a surface 7A. The surface 7A may be perpendicular to the axis of the coupling 1. The surface 7A may be flat, rounded, other shapes, or combinations thereof. The surface 7A may be an outward-facing surface of a lip or step that extends radially inward. The surface 7A may provide an abutment with which to capture the filter element 6. The bore 7 may receive various components, for example to locate and/or secure the components therein. In some embodiments, the bore 7 receives the filter element 6 to locate and hold the filter element 6 in place. In some embodiments, the bore 7 locates and holds an annular seal, such as an O-ring.

The cavity 2 may include a flow passage 9. The cavity 2 may have the flow passage 9 in fluid communication with the bore 7. The flow passage 9 may be adjacent to the bore 7. In some embodiments, the flow passage 9 may include one or more openings of various sizes. The flow passage 9 may provide for fluid flow out the inward end and into the separate device with which the tube 8 is being connected.

In some embodiments, the coupling 1 may include the cavity 2. The coupling 1 may include the cavity 2, for example where the cavity 2 may be part of a fitting included with (e.g. assembled with or otherwise accompanying) the coupling 1. The cavity 2 may be part of an adaptor etc. to be used with the coupling 1 for connection to various separate devices. The adaptor may be a universal adaptor configured to connect on one end to a variety of different separate devices and on the other end to the coupling 1.

In some embodiments, the coupling 1 does not include the cavity 2. For example, the cavity 2 may be part of, or intended for use with, a device that is separate from (e.g. not assembled with or otherwise accompanying) the coupling 1. Such separate devices may include, for example, a tank, air tank, vessel, container, fluid transport system, fluid power system, reservoir, solenoid valve manifold, valve manifold block, air compressor, air spring end cap, another component of a fluid transport system, or other suitable separate devices. The cavity 2 may be a connection, port, fitting, bracket, adaptor, universal adaptor, etc. that is on, in or otherwise used with such separate devices.

The coupling 1 connects to the cavity 2, as further described herein. The coupling 1 may be installed with the tube 8 and the cavity 2. The opening 2A, reduced diameter section 2B and/or the increased diameter section 2C may facilitate capturing and maintaining the coupling 1 and the tube 8 within the cavity 2, as further described. The cavity 2 may include the bore 7, which may be a filter bore configured to receive therein the filter element 6. The opening 2A may receive therethrough the filter element 6, the tube support 3, a portion of the collet 11, and a portion of the tube 8. The opening 2A may also receive therethrough the seal 10 and/or other seals. The tube support 3 may be located partially or entirely within the cavity 2.

In some embodiments, external threads of the attachment portion 5 at the second end 3C of the tube support 3 is configured to rotatably couple with the internal threads of the attachment portion 4 on an interior surface of the cavity 2. As such, the tube support 3 can be axially oriented within the cavity 2, by way of external attachment portion 5 machined into the outer diameter of the tube support 3 and mating internal threads of the attachment portion 4 machined into an inner diameter of the cavity 2. The engagement of the external threads of the tube support 3 with the internal threads 4 of the cavity 2 may be configured such that rotating the tube support 3 installs or removes the tube support 3. Further, installation, e.g. rotation, of the tube support 3 can capture, for example sandwich, the filter element 6, in between the tube support and the cavity 3. In some embodiments, a seal may also be captured between various portions of the tube support 3 and of the cavity 2. For example, the filter element 6, the seal, and/or other components may be captured between the second end 3C of the tube support 3 and the bore 7 of the cavity 2.

In some embodiments, the coupling 1 includes a non-removable tube support 3. Such a tube support 3 may be permanently affixed to the cavity 2, for example by way of interference press fitting. This particular embodiment may reduce the manufacturing cost but may yield a less easily serviceable filter element 6. In this case, the entire push-to-connect coupling 1 could be considered disposable when the filter element 6 becomes overly contaminated or the coupling 1 otherwise needs replacing.

The coupling 1 can also include the filter element 6, as shown. The filter element 6 may be rounded, e.g. circular, other shapes, or combinations thereof. The filter element 6 may have a relatively small thickness (measured axially as oriented in the figures) compared to its width, e.g. its diameter. The filter element 6 may be dome-shaped. Edges or a perimeter of the filter element 6 may be captured in the coupling 1 and/or cavity 2, as described. In some embodiments, the filter element 6 may be dome-shaped, flat, angled, other shapes, or combinations thereof.

The filter element 6 may be formed from a variety of materials. In some applications, it is desirable to utilize steel or a metallic alloy for one or more components of the coupling 1, such as the filter element 6. Accordingly, in some embodiments, the filter element 6 may be made from steel or a metallic alloy. In this regard, material variations may include variations of the stainless steel screen mesh size for the filter element 6, or completely different materials all together such as other ferrous or nonferrous metals, sintered bronze, paper, foam, plastic, etc.

The filter element 6 may be a mesh or screen type filter. For instance, the filter element 6 may have a series of openings therethrough sized to prevent certain debris from flowing through the filter element 6 while allowing fluid to flow through. The size of the openings in the filter element 6 may be optimized for the particular application. A smaller mesh may be selected in order to filter smaller contaminants when desired, but this smaller mesh may also create a higher flow restriction which may be undesirable for certain applications. Conversely, a larger mesh may be selected resulting in a lower flow restriction but may provide less fine filtration capability. In some embodiments, the filter element 6 may be made by stamping an 80 mesh T316 Stainless 0.0037 inch wire diameter screen sheet into the shape described herein. This may be desirable in order to maximize surface area of the filter element 6 and in turn minimize the flow restriction therein. Other standard mesh sizes may be used, e.g. 10, 12, 14, 16, 18, 20, 25, 30, 35, 40, 45, 50, 60, 70, 80, 100, 120, 140, 170, or 200 mesh, or other mesh sizes, may be used. In some embodiments, the ratio of area of the openings to the total flow area of the filter element 7, or the porosity or void fraction of the volume of voids over the total volume, may be from about ten percent to about ninety-five percent, or any other lesser or greater amount.

Those skilled in the art will also realize that obvious variations to the filter element 6 exist, such as other shapes or other materials. Shape variations other than "domed" may include flat, conical, hemispherical, etc. Material variations for the filter element 6 may include variations of the stainless steel screen mesh size previously described, or completely different materials all together such as other ferrous or nonferrous metals, sintered bronze, paper, foam, plastic, etc.

The filter element 6 may be captured within or by the coupling 1, as described herein. In some embodiments, the filter element 6 is positioned within the coupling 1 that sits against the opening at the second end 3C of the tube support 3, and in the path of the fluid flow passage 9. In one embodiment, as shown in FIGS. 1-3, the filter element 6 fits tightly within the bore 7 positioned at or near the inward end of the cavity 2 for the purpose of filtering contamination or debris out of the fluid or air passing from the tube 8 to the flow passage 9, or from the flow passage 9 to the tube 8. In this example, the filter element 6 may be held captive by the removable tube support 3. In some embodiments, the close fit between the tube support 3, the filter element 6, and the interior surface of the cavity 2 resists the passage of fluid-borne contaminants beyond the filter element 6. In some embodiments, the filter element 6 may be secured by one or more seals, as described herein.

The coupling 1 may include a seal 10. The seal 10 may be configured to provide a fluid- and/or air-tight seal between the exterior surface of the tube 8 and the interior surface of the cavity 2. In some embodiments, the seal 10, for example an O-ring, seals an outer surface of the tube 8 to an inner surface of the cavity 2. The seal 10 may seal an outer surface of the tube 8 to the increased diameter section 2C of the cavity 2. The seal 10 may seal fluid within the coupling 1. The tube 8 may be inserted through the seal 10. To provide a watertight or airtight seal, the O-rings 10 may be made from a resilient material, such as Buna-N, nitrile, Viton, Silicone, or urethane.

In some embodiments, the coupling 1 may include one or more seals, e.g. an annular seal, at or near the filter element 6. This may improve the sealing connection between the filter element 6 and the bore 7. As further example, this seal could be any one of a variety of suitable seals, for example, a standard O-ring type, or an elastomeric type over-molded to the outer perimeter of the filter element 6. This embodiment may improve the filtration ability of the invention for applications that require less contamination or debris.

In some embodiments, the filter element 6 may be secured to the inward end of the tube support 3, e.g. with the second end 3C. A perimeter of the filter element 6 may engage with various features of the tube support 3, such as a flange, lip, ridge, hook, clip, insert, etc. formed at or near the second end 3C. Such a securement can assist with installation and/or removal of the filter element 6 in the coupling 1.

The coupling 1 may include the collet 11. The collet 11 may be formed of a variety of materials. In some embodiments, the collet 11 is manufactured using brass and/or aluminum, or alloys thereof. In some embodiments, the collet 11 is made from plastics, polymers, metals, other materials, or combinations thereof.

The collet 11 may include a plurality of fingers 11A and an annular base 11B. The fingers 11A may be flexible. The fingers 11A may be cantilevered having a first fixed end and extending to an opposite, second free end. The first fixed ends of the fingers 11A may extend longitudinally, e.g. axially, from the base 11B to the second free end. There may be eight fingers 11A. In some embodiments, there may be fewer than or more than eight fingers 11A. The fingers 11A may be distributed evenly circumferentially along the base 11B. In some embodiments, fingers 11A may be distributed unevenly circumferentially along the base 11B.

The fingers 11A may include a ridge 11G. The ridge 11G may be located at or near the fixed end of the fingers 11A near the base 11B. The ridge 11G may be a protrusion extending radially outward. All, some or none of the fingers 11A may include the ridge 11G. The one or more ridges 11G may prevent insertion of the collet 11 too far into the cavity 2. For example, the ridges 11G may be sized to have an outer width, e.g. outer diameter, that is larger than the inner width of the reduced diameter section 2B, such that the ridges 11G cannot be advanced inward into the cavity 2 beyond the reduced diameter section 2B.

The fingers 11A may include a flexible portion 11C. The first end of the fingers 11A may include the flexible portions 11C attached to the base 11B. The flexible portions 11C may include one or more of the ridges 11G. The second (free) end of the fingers 11A may include a projection 11D. The projection 11D may project radially outward from the second free end of the finger 11A. For clarity, only some of the flexible portions 11C and projections 11D are labelled in FIGS. 2-3. By "radially outward" it is meant in a direction generally away from the longitudinal axis. By "radially inward" it is meant in a direction generally toward the longitudinal axis. All, some or none of the fingers 11A may include the projection 11D. The fingers 11A can flex radially inward and/or radially outward. The collet 11 defines an opening 11E (see FIG. 2) extending through the collet 11. The base 11B and fingers 11A may define the opening 11E. The fingers 11A may flex toward or away from the opening 11E. The opening 11E may be configured to receive the tube 8 and/or tube support 3 therein.

When assembled with the cavity 2, the collet 11 may be inserted into the cavity 2. The collet 11 may be partially inserted into the cavity 2. The collet may extend through the opening 2A. In some embodiments, the fingers 11A can flex outward slightly for axial insertion of a tube 8 through the collet 11. In some embodiments, the fingers 11A further define an inner clamping portion 11F on a radially inward surface of the fingers 11A. The clamping portion 11F may surround an outer contour of the tube 8 for allowing axial insertion of the tube 8 through the collet 11. The clamping portion 11F may have features such as positive serrations, annular ribs, grooves, protrusions, teeth, other features, or combinations thereof. These and other features may assist with securing, e.g. gripping into, the tube 8, to prevent or reduce relative axial movement between the tube 8 and the collet 11.

The tube 8 may be assembled simply with the tube support 3, the collet 11 and the filter element 6. The external attachment portion 5 of the tube support 3 may be configured to rotatably couple with the internal threads 4 of the cavity 2 such that the second end 3C of the tube support 3 compresses the filter element 6 between the tube support 3 and the bore 7 of the cavity 2. The collet 11 may be configured to be inserted through the opening 2A of the cavity 2 and farther into the cavity 2 by inwardly flexing the fingers 11A through the reduced diameter section 2B of the cavity 2 and outwardly flexing the fingers 11A in the increased diameter section 2C and/or in the transition portion 2BC of the cavity 2. The opening 11E of the collet 11 is configured to receive the tube 8 therein with the tube 8 extending over the tube support 3 such that the inner clamping portion 11F of the collet 11 secures the tube 8 over the tube support 3. In some embodiments, the outer diameter of the shaft portion 3A of the tube support 3 may be less than the inner diameter of the surrounding tube 8, such that there is an annular gap between the tube 8 and the tube support 3, as further described herein.

The filter element 6 may be captured within or by the coupling 1, as described herein. The tube support 3 may be removed and installed with a flat head screwdriver or similar type tool, allowing the filter element 6 to be easily accessed and removed for servicing, cleaning, replacement, etc. The tube support 3 may be assembled with the cavity 2, for example by threading, to capture the filter element 6. In some embodiments, the filter element 6 is inserted into the cavity 2, followed by the tube support 3, then the seal 10, and then the collet 11. The tube 8 may then be pushed into the coupling 1 to connect the tube 8 to the coupling 1, and the tube 8 can be removed from the cavity 2 by disengaging the collet 11, as described herein.

In some embodiments, the collet 11 may initially be assembled with the cavity 2 and remain with the cavity 2. The tube support 3 may then be inserted into the cavity 2 and through the collet 11. To initially assemble the collet 11 with the cavity 2, the fingers 11A of the collet 11 may flex radially inwardly to fit through the reduced diameter section 2B of the cavity 2 and then flex outward inside the increased diameter section 2C of the cavity 2. The tube 8 may be inserted axially through the collet 11 and over the tube support 3.

The coupling 1 may provide for securing the tube 8 in the cavity 2. Upon application of a removal force on the tube 8 in a direction out of the cavity 2 ("outer" direction as indicated), the reduced diameter section 2B and/or the transition portion 2BC of the cavity 2 may apply a clamping force. This interaction of the fingers 11A with the cavity 2 may result in the clamping force to provide opposing axial inward forces and/or radially inward forces on the projections 11D of the fingers 11A. This may move the clamping portion 11F, e.g. circumferential serrations, into or onto the outside wall of the tube 8 and thereby retain the tube 8. For example, the clamping portion 11F may apply a friction force along an outer surface of the tube 8 and/or a normal force in the axial direction due to serrations digging into the tube 8.

The various components of the coupling 1 may be assembled in different orders. In some embodiments, the filter element 6 is captured within the cavity by the tube support 3, and then the seal 10 and the collet 11 are placed inside the cavity 2 over the tube support 3, and then the tube 8 is inserted into the cavity 2 over the tube support 3 and through the collet 11 and seal 10.

The collet 11 may be secured inside the cavity 2 due to the resilient fingers 11A flexing outward to a free state within the increased diameter section 2C of the cavity 2. Inside the increased diameter section 2C, the fingers 11A are prevented from exiting the cavity 2 due to the adjacent reduced diameter section 2B and/or transition portion 2BC and the inability to flex inward due to the tube 8 preventing such inward flexing. The projections 11D may thus contact and compress against the reduced diameter section 2B (the reduced diameter section 2B may include the transition portions 2AB and/or 2BC, as described), thus preventing the collet 11 from exiting the cavity 2. Such compression may act axially. In some embodiments, an opposing face or faces, of the reduced diameter section 2B and/or the transition portion 2BC, and the projections 11D may be angled, as shown. Thus, increased compression between the projections 11D and the reduced diameter section 2B may also have a vertical component perpendicular to the axis, as oriented in FIG. 3A. Thus the compression force may act perpendicularly to the angled, abutting surfaces of the reduced diameter section 2B and the projections 11D. This may cause the fingers 11A to flex inward slightly, compressing the tube 8 over the tube support 3 and preventing the tube 8 from sliding off the tube support 3.

In some embodiments, internal pressures of the tube 8, such as from flowing or otherwise pressurized fluid or air inside the tube 8, may act outwardly on the collet 11 thus increasing the compression between the projections 11D and the reduced diameter section 2B of the cavity 2. Any pressure exerted by the tube 8 which may cause the collet 11 to want to exit the cavity 2 will create an increased compression between the projections 11D and the reduced diameter section 2B. The inner clamping portion 11F and features thereof, such as serrations, etc., can further enhance this increased securing of the tube 8 by the collet 11 due to increased internal tube 8 pressures. By "internal pressure" of the tube 8 it is understood to mean a pressure greater than atmospheric, for example a relatively higher pressure due to pressurized fluid inside the tube 8.

The tube 8 may be removed from the cavity 2 by removing the clamping force (as described herein) from the collet 11 on the tube 8. This clamping force may be removed by pushing the collet 11 farther into the cavity to move the fingers 11A away from the reduced diameter section 2B and/or away from the transition portion 2BC. The projections 11D may then not be in contact with the reduced diameter section 2B and/or the transition portion 2BC. This may allow the fingers 11A to flex away from the tube 8 or otherwise decrease the clamping force applied to the tube 8. The reduction or removal of the clamping force from the collet 11 on the tube 8 in this manner allows the tube to be easily removed, e.g. by pulling the tube 8 out of the cavity 2.

As mentioned, the collet 11 may remain with the cavity 2 to facilitate connecting and releasing the tube 8 as needed. However, the collet 11 may be removed from the cavity 2, for example to remove the filter 6, replace the collet 11, etc. To remove the collet 11 from the cavity 2, the fingers 11A must flex inward to pass through the reduced diameter section 2B of the cavity 2. If the tube 8 is connected, the collet 11 may be forced farther into the cavity 2 to release the clamping portion 11F from the outer surface of the tube 8, and the tube 8 can then be pulled out, as described herein. The collet 11 may then be pulled out with sufficient force to flex the fingers 11A inward as the fingers 11A pass through the reduced diameter section 2B. The collet 11 may be thus removed from the cavity 2.

Figure 3B:
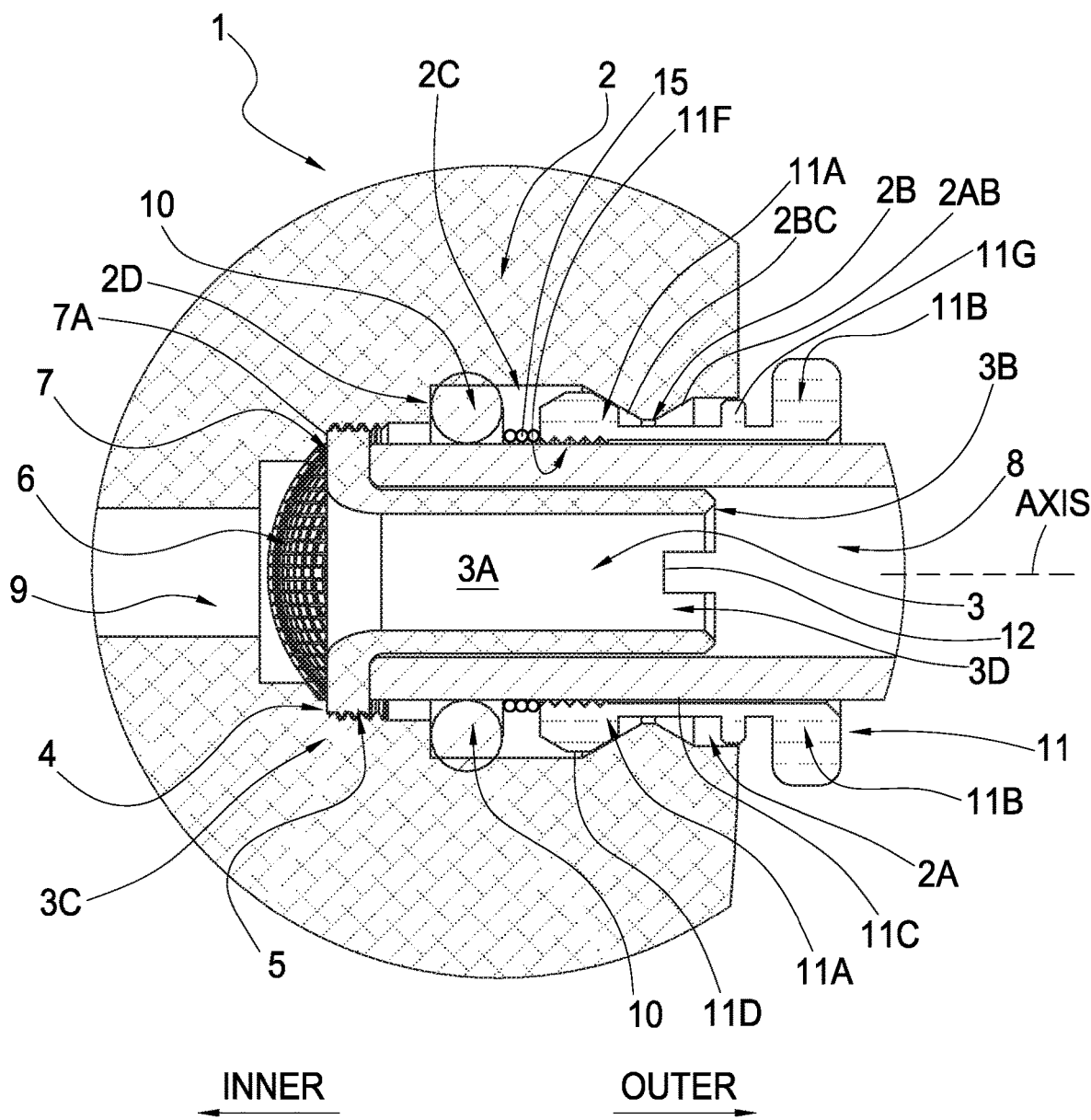
FIG. 3B illustrates a cross-sectional view of another embodiment of the push-to-connect coupling of FIG. 1 having a spring.

FIG. 3B illustrates a cross-sectional view of another embodiment of the push-to-connect coupling 1. The coupling 1 shown in FIG. 3B may be the same as the coupling 1 of FIG. 3A with the addition of a spring 15. As shown in FIG. 3B, the spring 15 may be located axially in between the seal 10 and the collet 11. The spring 15 is shown in cross-section view. The spring 15 may have coils wrapped about the axis as oriented when installed. The diameter of the spring 15 may be various sizes. The spring 15 may have an outer diameter that is similar to the inner diameter of the increased diameter section 2C. The spring 15 may contact the seal 10 and/or the collet 11. The spring 15 on the inner end may contact part of the cavity 2, for example the transition portion 2D, for instance if the seal 10 is not included. The spring 15 may be a compression spring. The spring 15 may bias the collet 11 outward. Increased pressure in the tube 8 may bias the collet 11 farther outward into the reduced diameter section 2B, thus increasing the clamping force. The spring 15 may also bias the collet 11 in such manner, for instance after such pressure has been reduced or removed. For example, the collet 11 may be pushed inward to depress the spring 15 so that the fingers 11A flex radially outward, the clamping force is removed and/or reduced, and one can easily pull the tube 8 from the tube support 3.

The spring 15 may serve as a safety feature. Absent a hand or other tool pushing in the collet 11, the spring 15 may bias the collet 11 outward and make sure the coupling 1 was always applying some clamping force and thus retaining the tube 8 thereon. The spring 15 may also provide robustness to the system due to anomalous loading conditions, such as vibrations that may apply excessive and unwanted inward forces on the collet 11 beyond what the pressure in the tube 8 is capable of counteracting to keep the coupling 1 secure in the cavity 2.

The spring 15 may not always be included. For instance, the axial and/or radial dimensions of the coupling 1 can be designed such that the fingers 11A are always impinging on the reduced diameter section 2B and/or the transition portion 2BC. Such structural design features may also always apply an impinging clamping force with the collet 11 acting against the cavity 2, absent an outside influence (e.g. from pressure in the tube 8 and/or from the spring 15).

Figure 4:
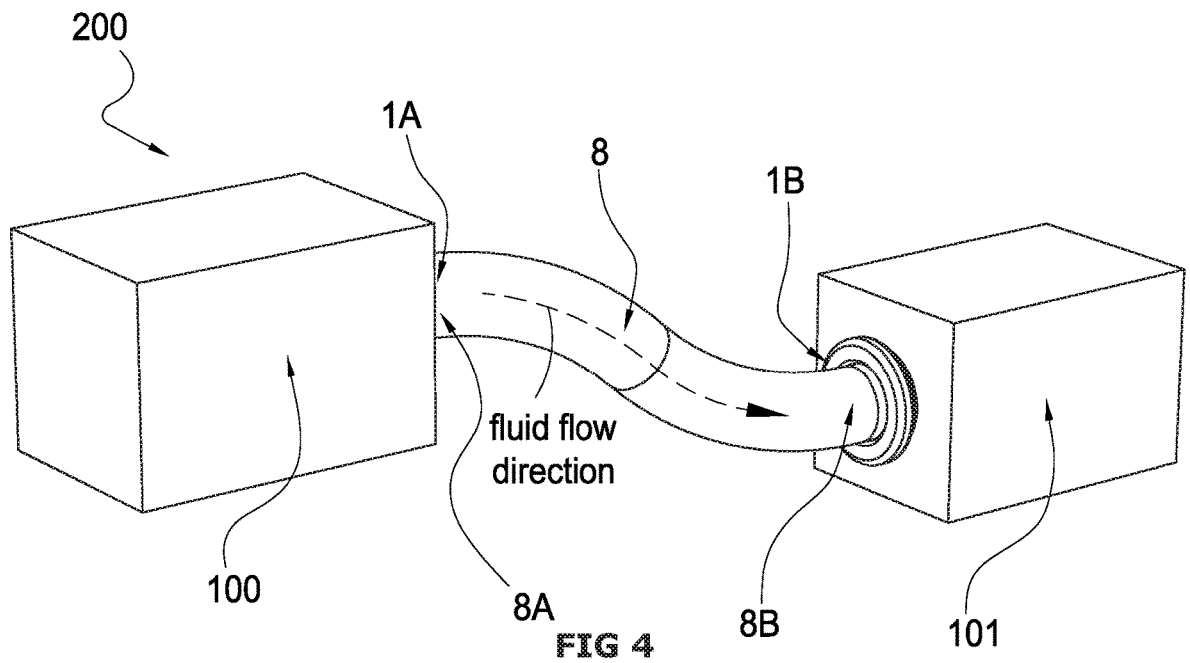
FIG. 4 is a perspective view of an assembly having two devices fluidly connected to a tube via two of the push-to-connect couplings of FIG. 1.
Figure 5:
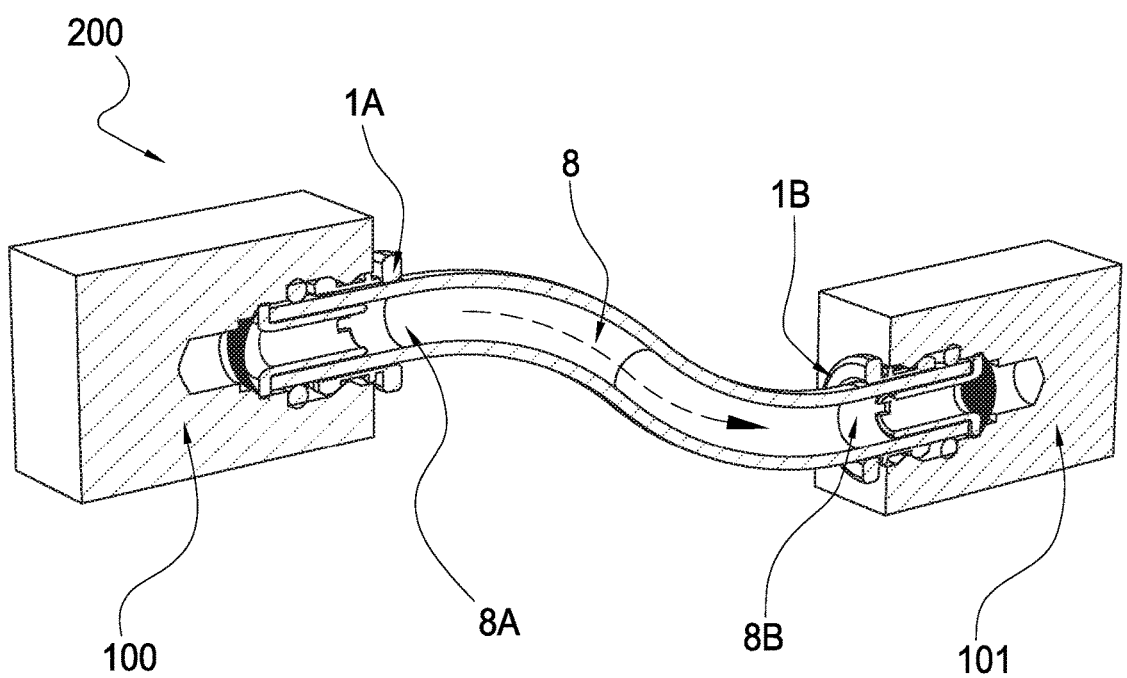
FIG. 5 is a cross-sectional view of the assembly of FIG. 4.

FIGS. 4 and 5 show an example use of the coupling 1 to connect the tube 8 to a first device 100 and a second device 101. FIG. 4 is a perspective view of an assembly 200 having two devices 100, 101 fluidly connected to the tube 8 via two of the push-to-connect couplings 1. FIG. 5 is a cross-sectional view of the assembly 200. The devices 100, 101 may be any number of suitable devices for fluidly connecting to the tube 8, as described herein. For example, the devices 100, 101 may be a fluid transport system, fluid power system, an air tank, a reservoir, a solenoid valve manifold, a valve manifold block, an air compressor, an air spring end cap, or other devices.

The assembly 200 may include the tube 8 having an upstream portion 8A and a downstream portion 8B. Fluid may flow through the tube 8 from the first device 100 to the second device 101 in the direction indicated, or vice versa in the opposite direction. The upstream portion 8A may be fluidly connected to the first device 100 via a push-to-connect coupling 1A, which may be the push-to-connect coupling 1 described herein. The downstream portion 8B is fluidly connected to the second device 101 via a push-to-connect coupling 1B, which may be the push-to-connect coupling 1 described herein. Both of the push-to-connect couplings 1A, 1B may include the filter element 6. In some embodiments, the push-to-connect coupling 1A includes the filter element 6, while the push-to-connect coupling 1B does not include the filter element 6. In some embodiments, the push-to-connect coupling 1A does not include the filter element 6, while the push-to-connect coupling 1B includes the filter element 6. Each of the couplings 1A and 1B can be connected to the devices 100 and 101 the cavity 2. The cavity 2 may be part of the devices 100 and/or 101. The cavity 2 may be part of the couplings 1A and/or 1B, as described herein.

Figure 6A:
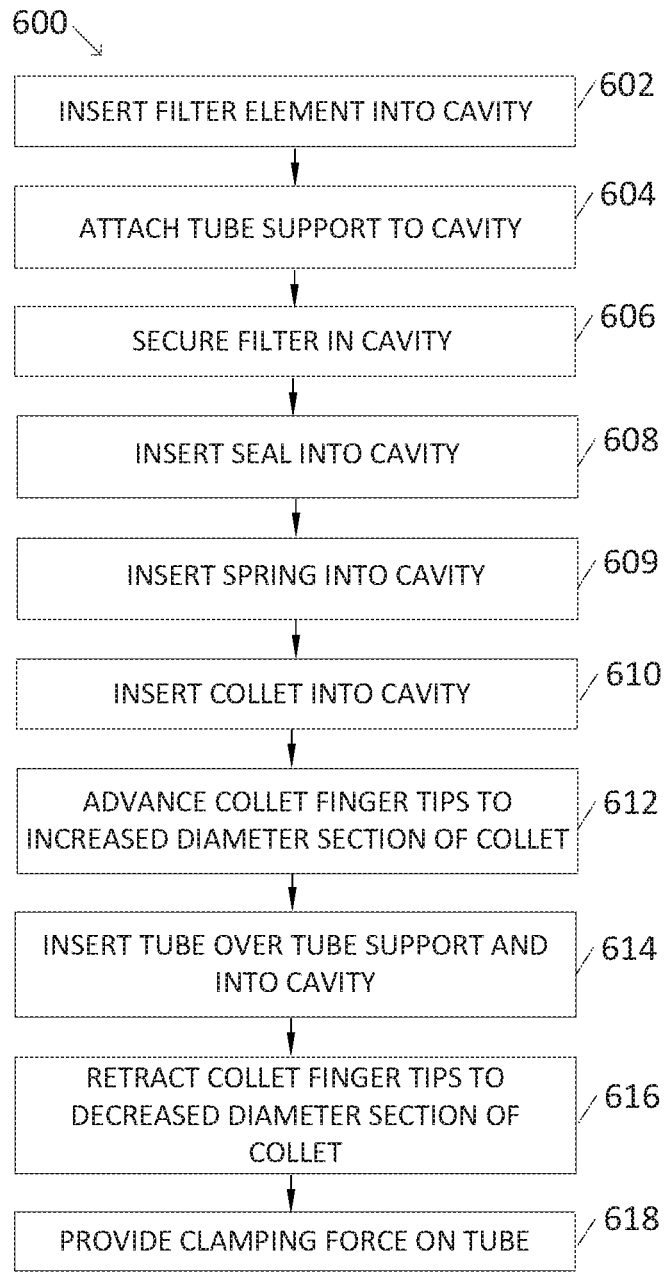
FIGS. 6A-6B are flowcharts showing various embodiments of methods for using the coupling of FIG. 1.
Figure 6B:
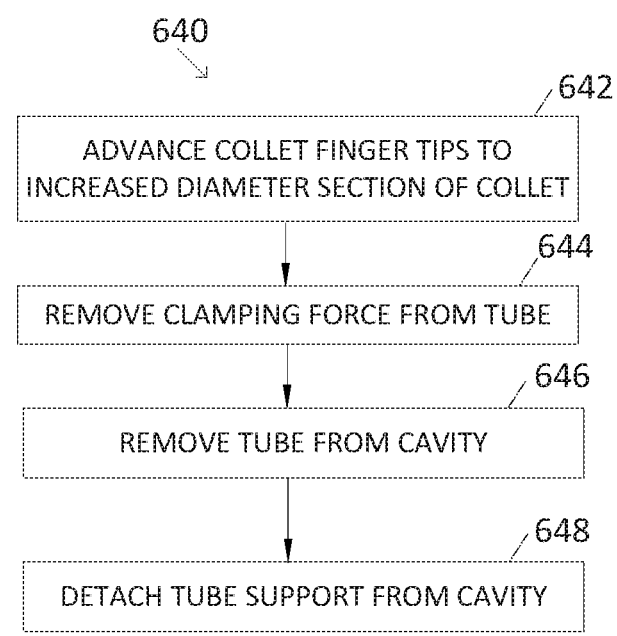

FIGS. 6A-6B are flowcharts showing various embodiments of methods for using a coupling. The methods may be used with any of the couplings described herein, such as the coupling 1. FIG. 6A is a flowchart showing an embodiment of a method 600 for assembling a coupling with a cavity. The method 600 may be used for assembling the coupling 1 with the cavity 2.

The method 600 begins with step 602 wherein a filter element is inserted into a cavity. The filter element 6 may be inserted into the cavity 2, as described herein. The filter element 6, for example a mesh filter, may be inserted into the cavity 2 and located in or near the bore 7, which may be on the surface 7A of the bore 7. In some embodiments of the method 600, step 602 may be omitted, for example where a filter is not included. In some embodiments, the filter element may be included with the tube support and inserted into the cavity with the tube support.

The method 600 then moves to step 604 wherein a tube support is attached to the cavity. In step 604 the tube support 3 may be attached to the cavity 2, as described herein. The attachment portion 5 of the tube support 3 may be connected to the attachment portion 4 of the cavity 2, for example by rotating external threads of the attachment portion 5 to engage internal threads of the attachment portion 4. The tube support may be inserted through the collet and/or the seal. In some embodiments, the tube support may be inserted prior to or after inserting the collet and/or seal. The tube support may contact any filter element inside the cavity.

The method 600 then moves to step 606 wherein the filter element is secured in the cavity. The filter element 6 may be secured in the cavity 2. The filter element may be secured by being sandwiched between the tube support and the cavity, for example between the second end 3C of the tube support 3 and the surface 7A of the bore 7. The edges or periphery of the filter element may be secured in such manner. In some embodiments, step 606 may be omitted, for example where no filter is included.

The method 600 then moves to step 608 wherein a seal is inserted into the cavity. The seal 10 may be inserted into the cavity 2. The seal 10 may be inserted into the increased diameter section 2C. The seal 10 may be inserted and located at or near the transition portion 2D. The seal 10 may be inserted prior to or after the filter element and/or the collet. In some embodiments, the step 608 may be omitted, for example where a seal is not included.

The method 600 then moves to step 609 wherein a spring is inserted into the cavity. The spring 15 may be inserted into the cavity 2. The spring 15 may be inserted into the increased diameter section 2C. The spring 15 may be inserted and located axially in between the seal 10 and the free ends of the fingers 11A on the collet 11. In some embodiments, the step 609 may be omitted, for example where a spring is not included.

The method 600 then moves to step 610 wherein a collet is inserted into the cavity. The collet 11 may be inserted into the cavity 2, as described herein. The collet 11 may be inserted by pushing the collet 11 into the cavity 2 such that the fingers 11A flex radially inward to fit through the reduced diameter section 2B of the cavity 2, as described herein. The collet 11 may be farther inserted by pushing the collet 11 into the cavity 2 such that the fingers 11A flex radially outward in the increased diameter section 2C of the cavity 2, as described herein. In some embodiments, step 610 may be omitted, for example where the collet 11 is already assembled with the cavity 2, as described herein.

The method 600 then moves to step 612 wherein the fingertips of the collet are advanced into the increased diameter section of the cavity. The projections 11D of the fingers 11A may be advanced into the increased diameter section 2C of the cavity 2. In some embodiments, the projections 11D may be advanced to the transition portion 2BC of the cavity 2. The collet may be advanced by pushing the collet axially farther inward into the cavity. The collet may be pushed by hand. In some embodiments, step 612 may include compressing the spring 15 with the collet 11.

The method 600 then moves to step 614 wherein a tube is inserted over the tube support and into the cavity. The tube 8 may be inserted over the tube support 3 and into the cavity 2. The upstream portion 8A or downstream portion 8B of the tube 8 may be inserted. The end of the tube may contact the second end 3C of the tube support 3 inside the cavity 2. In some embodiments, the tube 8 is inserted through the seal 10, such that the seal is compressed slightly between the tube 8 and the increased diameter section 2C of the cavity.

The method 600 then moves to step 616 wherein the fingertips of the collet are retracted to the decrease diameter section of the cavity. The projections 11D of the fingers 11A may be retracted into the decreased diameter section 2B of the cavity 2. In some embodiments, the projections 11D may be retracted to the transition portion 2BC of the cavity 2. The collet may be retracted by pulling the collet axially farther outward from the cavity. The collet may be pulled by hand.

The method 600 then moves to step 618 wherein a clamping force is provided to the tube. A clamping force may be provided to the tube 8 by the fingers 11A of the collet clamping down on the tube, as described herein. The clamping portion 11F of the collet 11 may compress the tube 8 onto the tube support 3. The tube may be secured due to the clamping force. The forces may be radial and/or axial, as described herein. Pressure from a flowing fluid may provide and/or contribute to the clamping force, as described herein.

FIG. 6B is a flowchart showing an embodiment of a method 640 for removing a tube from a cavity using a coupling. The coupling 1 may be used to remove the tube 8 from the cavity 2. The method 640 begins with step 642 wherein the fingertips of the collet are advanced to the increased diameter section of the cavity. Step 642 may be similar to step 612 of the method 600.

The method 640 then moves to step 644 wherein a clamping force is removed from the tube. The clamping force may be from the collet 11 impinging on the tube 8. A clamping force may be provided on the tube 8 by the fingers 11A of the collet clamping down on the tube, as described herein. Step 644 may involve the fingertips of the collet moving radially outward from the tube to remove the clamping force due to movement of the fingertips to the increased diameter section of the cavity. In step 644, the clamping portion 11F of the collet 11 may compress with less force or none at all on the tube 8.

The method 640 then moves to step 646 wherein the tube is removed from the cavity. The tube 8 may be removed from the cavity 2. In step 646, the tube may be removed by pulling the tube, for example by hand. The tube may slide off the tube support, such as the tube support 3. The tube may be moved in the outer direction.

The method 640 then moves to step 648 wherein the tube support is detached from the cavity. The tube support 3 may be detached from the cavity 2. The tube support may be released, freed, unsecured, allowed to move, or otherwise detached from the cavity. The tube support may be detached as described herein, for example by rotating the tube support to disengage a threaded engagement between the tube support and the cavity.

It will be understood that various changes in the details, materials, and arrangements of parts and components which have been herein described and illustrated in order to explain the nature of the push-to-connect coupling 1 may be made by those skilled in the art which are still within the principle and scope of the push-to-connect coupling 1.

The following sections provide some example applications or uses of the coupling 1 and associated methods described herein, which are not in any way intended to limit the scope of this disclosure. The coupling 1 may be used for applications besides those described herein.

Example Application 1

Automotive Air Suspension System

An automotive air suspension system requires an air management system in order to fill and empty the vehicle's air springs and in turn control the height of the vehicle. This air management system typically includes one or more air reservoirs, one or more electric air compressors, an electronic solenoid valve unit, and an electronic control unit. These components are interconnected to each other by way of flexible tubes and couplings. The push-to-connect coupling 1 and associated methods of use described herein can be used in these and similar systems. The coupling 1 provides a simple to use connection and with filtration capability for a more reliable air suspension system by preventing contamination or debris from entering precision sealing devices such as the electronic solenoid valves and in turn prevents undesirable leaks or functions from the electronic solenoid valves.

Example Application 2

Industrial Pneumatic Systems

Industrial pneumatic systems utilize compressed air to power devices by way of mechanical or electrical control valves. These components are interconnected to each other by way of flexible tubes and couplings. The push-to-connect coupling 1 and associated methods described herein may be used in these and similar systems. The coupling 1 provides a simple to use connection and with filtration capability for a more reliable pneumatic system.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is not limited by the various embodiments described herein.

The foregoing description details certain embodiments of the systems, devices, and methods disclosed herein. It will be appreciated, however, that no matter how detailed the foregoing appears in text, the systems, devices, and methods may be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those skilled in the art that parts included in one embodiment are interchangeable with other embodiments; one or more parts from a depicted embodiment may be included with other depicted embodiments in any combination. For example, any of the various components described herein and/or depicted in the figures may be combined, interchanged or excluded from other embodiments.

The processes or steps of any methods described and/or shown herein are illustrative only. A person of skill in the art will understand that the steps, decisions, and processes embodied in the methods described herein may be performed in an order other than that described herein. Thus, the particular descriptions are not intended to limit the associated processes to being performed in the specific order described.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced numbered embodiment recitation is intended, such an intent will be explicitly recited in the numbered embodiment, and in the absence of such recitation no such intent is present. For example, as an aid to understanding, the following appended numbered embodiments may contain usage of the introductory phrases "at least one" and "one or more" to introduce numbered embodiment recitations. However, the use of such phrases should not be construed to imply that the introduction of a numbered embodiment recitation by the indefinite articles "a" or "an" limits any particular numbered embodiment containing such introduced numbered embodiment recitation to embodiments containing only one such recitation, even when the same numbered embodiment includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce numbered embodiment recitations. In addition, even if a specific number of an introduced numbered embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification are to be understood as being modified in all instances by the term "about." Accordingly, unless indicated to the contrary, the numerical parameters set forth in the specification are approximations that may vary depending upon the desired properties sought to be obtained by the present invention. At the very least, and not as an attempt to limit the application of the doctrine of equivalents, each numerical parameter should be construed in light of the number of significant digits and ordinary rounding approaches.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention.

What is claimed is:

1. A push-to-connect coupling for connecting a tube to a body have a bore formed therethrough the coupling comprising:
   a tube support comprising an elongated cylindrical hollow shaft having an inner passage defining an axis and an annular flange formed at a first end of the hollow shaft, the hollow shaft adapted to be positioned within the inner diameter of the tube so that it is adjacent a first side of the annular flange, the annular flange threadably connected to the bore by rotation of the tube support with respect to the bore;
   a collet comprising an annular base and a plurality of fingers, the collet is configured to be positioned around the tube such that the tube is located between the tube support and the collet, wherein each finger includes a first end extending from the base to a second free end, the first end including a flexible portion attached to the base, and the second end including a projection extending radially outward, wherein the fingers each have an inner clamping portion configured to surround the tube,
   wherein the the collet is configured to be inserted into the bore to secure the tube in the bore, and a mesh filter positioned adjacent a second side of the annular flange, the annular flange, when threaded into the bore retains the position of the mesh filter.

2. The push-to-connect coupling of claim 1, wherein the filter element is dome-shaped.

3. The push-to-connect coupling of claim 1, wherein the fingers of the collet are configured to flex radially inward to compress the tube onto the tube support.

4. The push-to-connect coupling of claim 1, wherein the fingers of the collet are configured to flex radially inward by pulling the collet axially outward of the collet so that fingers contact a reduced diameter section of the cavity.

5. The push-to-connect coupling of claim 1, wherein the first end of the tube support comprises a slot configured to receive a tool to rotate the tube support.

6. The push-to-connect coupling of claim 1, further comprising a seal configured to extend circumferentially between the tube and the cavity.

7. The push-to-connect coupling of claim 6, wherein the seal is an O-ring.

8. A push-to-connect coupling system comprising: a coupling for connecting a tube to a body have a bore formed therethrough the coupling comprising:
- a tube support comprising a shaft having an inner passage defining an axis and an annular flange formed at a first end of the hollow shaft, the hollow shaft adapted to be positioned within the inner diameter of the tube so that it is adjacent a first side of the annular flange, the annular flange threadably connected to the bore by rotation of the tube support with respect to the bore;
- a collet comprising an annular base and a plurality of fingers the collet is configured to be positioned around the tube such that the tube is located between the tube support and the collet, wherein, each finger includes a first end extending from the base to a second free end having a projection extending radially outward, and
- a filter element positioned adjacent a second side of the annular flange, the annular flange, when threaded into the bore retains the position of the mesh filter
- an o-ring seal configured to be positioned within the bore and around the tube and a spring positioned around the tube and located between the o-ring seal and the collet the bore including a reduced diameter section and an opening adjacent the reduced diameter section configured to receive therethrough the filter element, the collet, the o-ring seal, the spring, the tube support and the tube.

9. The push-to-connect coupling system of claim 8, wherein the projections of the fingers are in contact with the reduced diameter section of the cavity to provide a clamping force on the tube with a clamping portion of the fingers.

10. The push-to-connect coupling system of claim 8, wherein the filter element is a mesh filter.

* * * * *